2,813,096

METHOD FOR PRODUCING DIHYDROISO-CODEINE

August H. Homeyer, Webster Groves, and George B. De La Mater, St. Johns, Mo., assignors to Mallinckrodt Chemical Works, St. Louis, Mo., a corporation of Missouri No Drawing. Application July 27, 1953,
Serial No. 370,633

2 Claims. (Cl. 260—285)

This invention relates to the production of narcotics and more particularly to a process for the manufacture of a codeine derivative.

This application is a continuation-in-part of our copending application Serial No. 269,121, filed January 30, 1952, now abandoned.

Briefly, this invention provides an effective method for the preparation of dihydroisocodeine by heating dihydrocodeine in the presence of an aluminum alkoxide and a solvent.

Among the objects of this invention are the provision of an improved process for the manufacture of the codeine derivative, dihydroisocodeine; the provision of a process of the type set forth which employs readily available starting materials; and the provision of a process of the type referred to which gives a good yield of dihydroisocodeine. Other objects will be in part apparent and in part pointed out hereinafter.

The invention accordingly comprises the methods hereinafter described, the scope of the invention being indicated in the following claims.

It has been found in accordance with the present invention that, if dihydrocodeine is reacted with an aluminum alkoxide, it is converted in good yield to dihydroisocodeine. This is a simple and convenient method for preparing the latter compound which heretofore could be prepared only by involved and ifficult procedures. Dihydroisocodeine is an analgesic which, so far as is known, possesses properties generally quite similar to those of dihydrocodeine.

The reaction should be carried out in a suitable solvent. Any of the inert solvents, such as benzene, toluene or xylene, may be employed.

The following examples illustrate specific embodiments of the reaction:

Example 1

Anhydrous dihydrocodeine (5 g.) was placed in a round-bottom flask with toluene (150 ml.). This mixture was heated to boiling and toluene (50 ml.) was distilled out to render the solution completely anhydrous. Aluminum tertiary-butoxide (1 g.) purified by vacuum sublimation, was added to the solution which was then refluxed for seventeen and one-half hours. The resulting clear light yellow solution was cooled to room temperature and shaken with a concentrated aqueous solution (50 ml.) of sodium potassium tartrate. The resulting emulsion was filtered through a bed of filter aid and the light yellow organic layer was separated and washed once with water. The organic layer was then extracted with dilute hydrochloric acid (50 ml.). The extract was shaken with chloroform (25 ml.) which was discarded. The aqueous acid solution was then made alkaline with sodium hydroxide and shaken with three 20 ml. portions of chloroform. The combined chloroform extracts were evaporated to dryness whereupon there remained a solid residue weighing 4.27 g. This residue was dissolved in boiling toluene (20 ml.), which upon cooling yielded 3 g. of crystalline material melting at 185–192° C. A small portion of this solid was purified by vacuum sublimation and showed a melting point of 197.8–201.2° C. Another small portion of the solid was treated with acetic anhydride and yielded an acetyl derivative melting at 166.1° C. Another portion of the solid was converted to a methiodide by treatment with methyl iodide. This compound melted at 273–277° C. The methoidide when treated with sodium hydroxide underwent conversion to a white crystalline base melting at 146–148.7° C. The properties of these derivatives, as well as those of the parent compound, illustrated that the material isolated from the reaction mixture was dihydroisocodeine. Mixed melting points of the parent compound and the acetyl derivative with authentic samples of dihydroisocodeine and its acetyl derivative, prepared by another method, gave no depression, further proving that the two samples were identical.

Example 2

Example 1 was repeated except that aluminum isopropoxide was used in place of aluminum tertiary-butoxide. The mixture was worked up the same as in Example 1. The crude alkaloid was purified chromatographically by adsorption on a column of aluminum oxide followed by elution with a mixture of benzene, chloroform and isopropyl alcohol. The dihydroisocodeine alkaloid recovered from this column was identical with an authentic sample and melted at 203.6–204.6° C.

Example 3

Aluminum ethoxide (6 g.) was dissolved in hot toluene (200 ml.) which had been previously distilled from calcium oxide. To this was added anhydrous dihydrocodeine (5 g.), and the mixture was refluxed for a total of eight hours. When cool, the reaction mixture was transferred to a separatory funnel and extracted with a concentrated aqueous solution of sodium potassium tartrate (100 ml.), followed by extraction with the tartrate salt solution (50 ml.) plus water (50 ml.), and finally by extraction with water (100 ml.). These extracts were combined, made alkaline with sodium hydroxide, extracted twice with toluene and the toluene extracts combined with the original reaction mixture. The toluene solution was extracted with three 50 ml. portions of dilute sulfuric acid (20 ml. of 10% sulfuric acid and 30 ml. of water), and finally with 10% sulfuric acid (10 ml.) plus water (20 ml.). The acid extracts were collected in a volumetric flask (200 ml.) and diluted to volume with water. A 25 ml. aliquot was transferred to a separatory funnel, made alkaline with a sodium hydroxide solution, and extracted with four 50 ml. portions of benzene. The benzene extracts were dried, filtered, combined, evaporated, and the residue was purified chromatographically as in Example 2. There was recovered from the column pure dihydroisocodeine.

Example 4

Aluminum 2-ethylhexylate-1 was prepared by dissolving aluminum isopropoxide (20 g.) in hot dry toluene (200 ml.), adding 2-ethylhexanol-1 (46 ml.), and fractionating off the toluene-isopropanol azeotrope. The theoretical amount of the azeotrope was obtained, showing that the reaction had gone to completion and all the aluminum isopropoxide had been converted to aluminum 2-ethylhexylate-1. A portion of the toluene solution (50 ml.) containing aluminum 2-ethylhexylate-1 (10.7 g.) was combined with dry toluene (70 ml.) containing dihydrocodeine (5 g.) and the mixture refluxed for a total of eight and one-half hours. The reaction mixture was collected, worked up and purified in the same fashion as in Example 3. There was recovered from the column pure dihydroisocodeine.

Example 5

Aluminum 4-methylpentylate-2 was prepared in a manner similar to that employed for the aluminum 2-ethylhexylate-1 described in Example 4. Again the theoretical amount of toluene-isopropanol azeotrope was obtained, indicating a complete conversion to aluminum 4-methylpentylate-2. A portion of the toluene solution (45 ml.) containing aluminum 4-methylpentylate-2 (8.1 g.) was added to the dry toluene (90 ml.) containing dihydrocodeine (5 g.) and the mixture refluxed for seven and one-half hours. The reaction mixture was worked up, purified according to the procedure described in Example 3, and found to contain dihydroisocodeine.

Example 6

Aluminum laurylate was prepared in the manner described in Example 4, and once more the theoretical quantity of the toluene-isopropanol azeotrope was obtained, showing that conversion to aluminum laurylate was complete. A portion of the resulting toluene solution (50 ml.) containing aluminum laurylate (14.3 g.) was combined with dihydrocodeine (5 g.) dissolved in dry toluene (100 ml.). The mixture was refluxed for six hours, worked up and purified in the manner described in Example 3, and found to contain dihydroisocodeine.

Many variations and modifications of this invention will be apparent to those skilled in the art. For example, the particular aluminum alkoxide employed is not critical and aluminum alkoxides other than aluminum tertiary-butoxide, aluminum isopropoxide, aluminum ethoxide, aluminum 2-ethylhexylate-1, aluminum 4-methylpentylate-2, and aluminum laurylate may be employed.

In view of the above, it will be seen that the several objects of the invention are achieved and other advantageous results attained.

As many changes could be made in the above methods without departing from the scope of the invention, it is intended that all matter contained in the above description shall be interpreted as illustrative and not in a limiting sense.

We claim:

1. The method of preparing dihydroisocodeine which comprises heating dihydrocodeine in the presence of aluminum tertiary-butoxide and a solvent.

2. The method of preparing dihydroisocodeine which comprises heating dihydrocodeine in the presence of aluminum tertiary-butoxide and toluene.

No references cited.